Oct. 24, 1950   R. H. CHRISTIAN   2,527,353
ENGINE GOVERNING APPARATUS
Filed Jan. 23, 1946   3 Sheets-Sheet 2

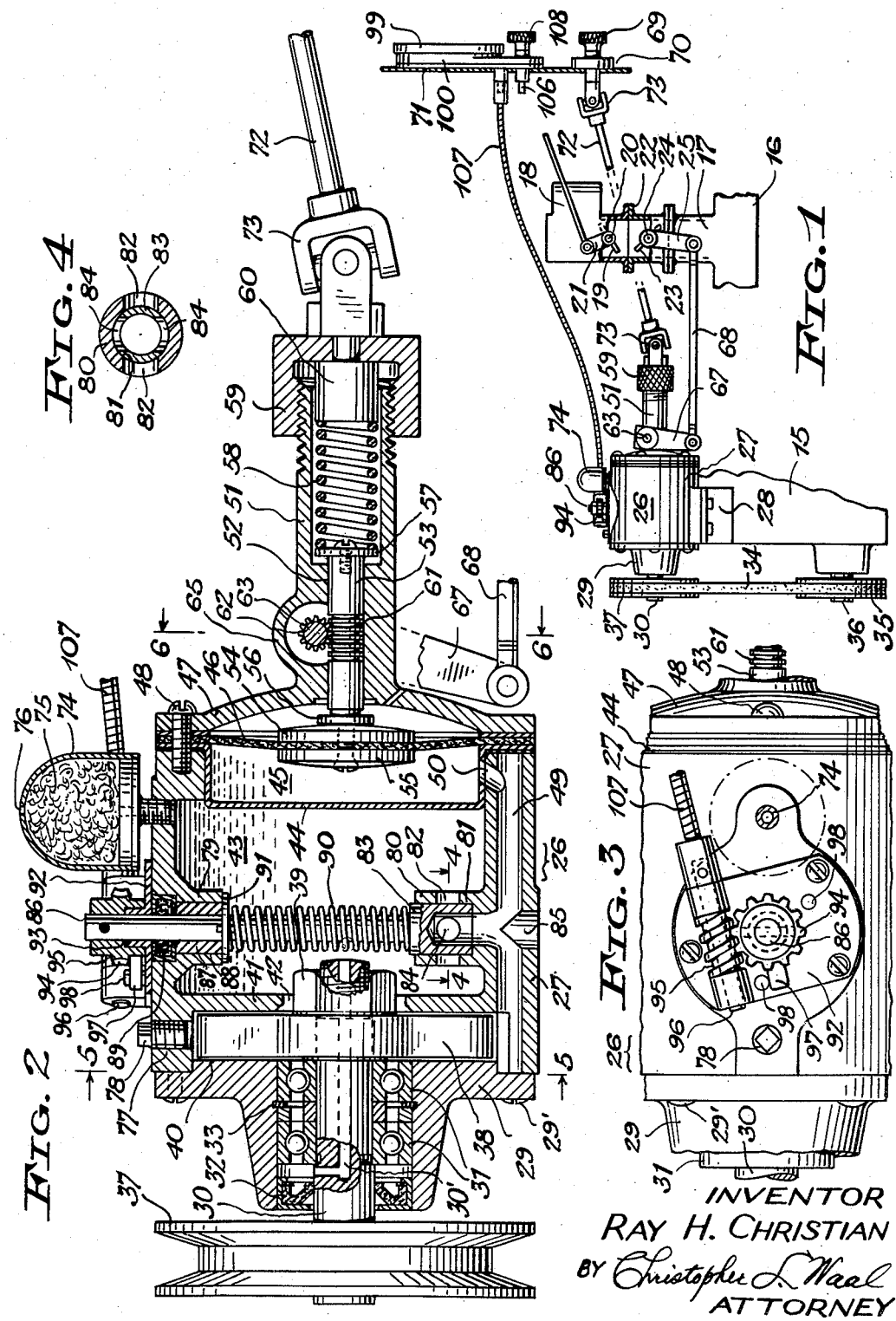

INVENTOR
RAY H. CHRISTIAN
BY Christopher L. Waal
ATTORNEY

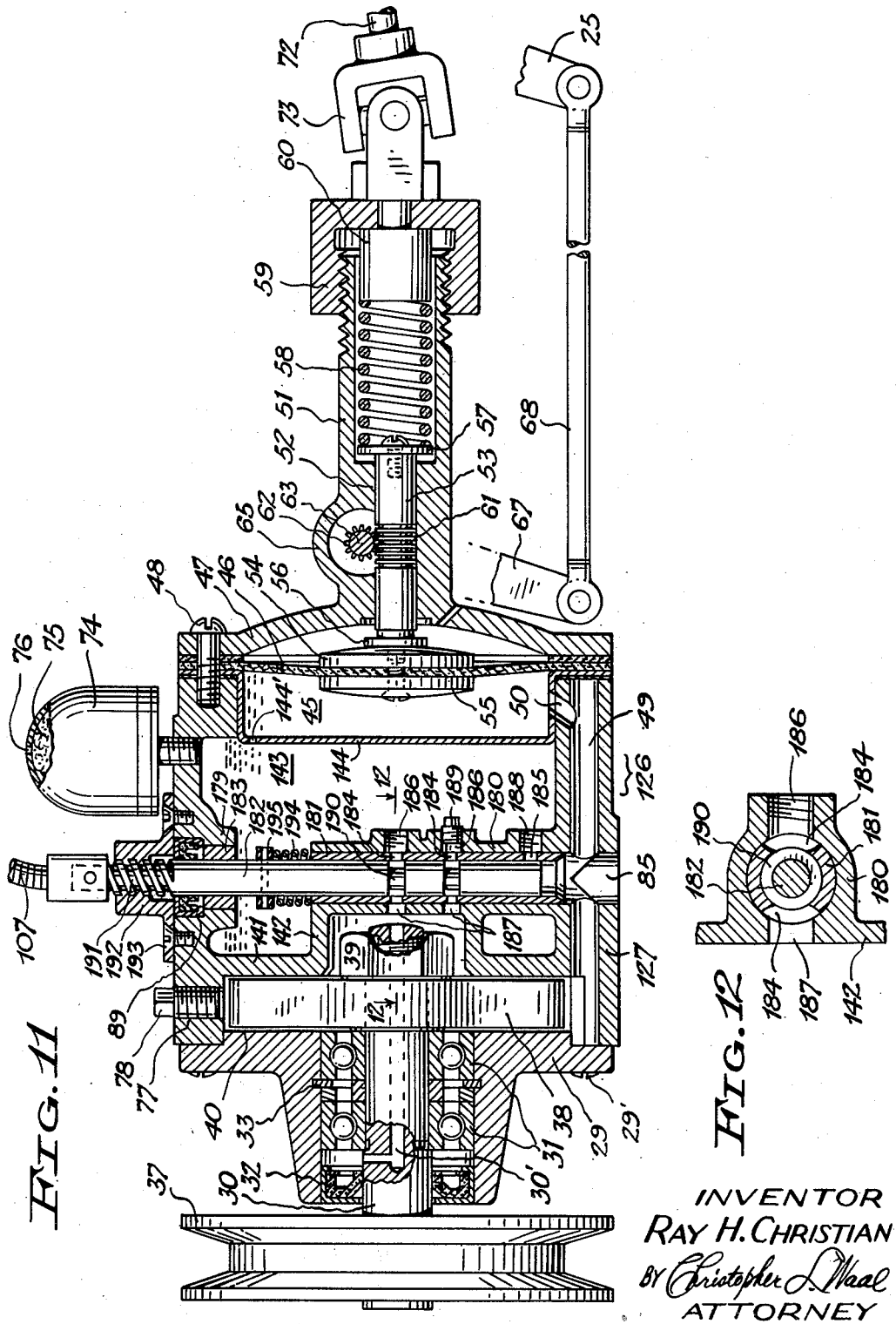

Patented Oct. 24, 1950

2,527,353

UNITED STATES PATENT OFFICE 2,527,353

ENGINE GOVERNING APPARATUS

Ray H. Christian, Wauwatosa, Wis., assignor to Milwaukee Lock & Mfg. Co., Milwaukee, Wis., a corporation of Wisconsin Application January 23, 1946, Serial No. 642,905

2 Claims. (Cl. 264—14)

The present invention relates to governing apparatus adapted for regulating and limiting the speed of prime movers such as internal combustion engines.

An object of the invention is to provide an improved form of governor adapted for application to an internal combustion engine, such as a vehicle engine with a power take-off, to maintain a constant but adjustable engine speed under varying load conditions.

Another object is to provide an engine governor which is simple and durable in construction and reliable in operation.

Still another object is to provide an engine governor having a fluid-pressure-actuated means opposed by a spring reaction means and which is so arranged as to permit a wide range of speed settings without substantial variation in spring pressure.

A further object is to provide an engine governor in which the speed setting is controllable either separately or conjointly by variation in spring pressure and limitation of fluid pressure.

A still further object is to provide a governor which is readily applicable to conventional types of engines.

The invention further consists in the several features hereinafter described and claimed.

In the accompanying drawings, illustrating certain embodiments of the invention, Fig. 1 is a side elevational view of an engine governing apparatus constructed in accordance with the invention, parts being broken away and parts being shown in section;

Fig. 2 is a longitudinal sectional elevational view of a fluid pressure generator of the governing apparatus;

Fig. 3 is a fragmentary top view of the pressure generator;

Fig. 4 is a detail sectional view of a by-pass valve for the pressure generator, taken on the line 4—4 of Fig. 2;

Fig. 11 is a view similar to Fig. 2, but showing a modified form of pressure generator, and Fig. 12 is a detail sectional view taken on the line 12—12 of Fig. 11.

Figure 7:
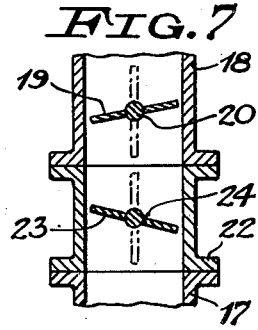
Fig. 7 is a sectional elevational view through the engine carburetor and manifold connection.

In these drawings, 15 designates an engine of the internal combustion type, such as a conventional vehicle engine which in some instances may be equipped with a power take-off, not shown. The engine is provided with an intake manifold 16 having an intake riser 17 connected to a downdraft carbureter 18, the carbureter having the usual throttle valve 19 mounted on a shaft 20. The shaft 20 is connected by a lever arm 21 to the usual manual actuating means, not shown, which manually controls the flow of the fuel charge into the intake manifold. Interposed between the outlet of the carbureter 18 and the intake riser 17 of the intake manifold 16 is a flanged conduit-forming housing 22 carrying a governor valve 23 of the butterfly type, Figs. 1 and 7, mounted on an operating shaft 24, this valve being disposed below the conventional throttle valve 19. The governor valve is of the balanced type; that is, it extends equally on opposite sides of the shaft. The outer end of the governor valve shaft 24 is provided with an arm 25 adapted to be connected to the governing means of the invention, hereinafter described. As is well understood in this art the conventional engine throttle valve 19 may be governor-controlled, in which case it is not necessary to provide a separate governor throttle valve.

A fluid pressure generator or pump, designated generally by the numeral 26, is driven by the engine and develops a pressure which varies with engine speed, as hereinafter described. The pressure generator 26 comprises a generally cylindrical reservoir-forming casing 27 which is suitably supported on the engine, as by a bracket 28. A hubbed cover or end cap 29 is secured to one end of the casing 27, as by screws 29′, the axis of the casing and cover extending horizontally. An impeller shaft 30 is journalled in the cover on a pair of ball bearings 31, and an oil seal 32 for the shaft is secured in the outer end of the cover. The ball bearings are suitably positioned in an axial direction, as by means including a snap ring 33. The shaft 30 is driven by the engine 15, as by means of a belt 34 passing over a pulley 35 on the engine crank-shaft 36 and over a pulley 37 secured to the outer end of the shaft 30. An impeller 38, here shown to be of a four-lobed type, is secured by a nut 39 to the inner end of the shaft 30 and rotates in a circular chamber 40 formed between the cover 27 and a flat partition wall 41 in the casing 27, the partition wall being spaced inwardly from the end face of the casing and having a central opening 42 to admit oil 43 or other suitable liquid from the casing into the impeller chamber. The shaft 30 has a duct 39' to limit pressure on the seal 32.

The end of the casing 27 distant from the impeller chamber is closed by a peripherally flanged cup member 44 which fits into the casing and forms a wall of a diaphragm chamber designated generally at 45 in Fig. 2. A flexible diaphragm 46 closes the diaphragm chamber and is clamped at its periphery to the flanged cup member by a flanged housing member 47, as by means of screws 48. A bore 49 extends longitudinally through the lower portion of the casing 27 and is closed at its opposite ends by the end cap 29 and by the peripheral flange of the cap member 44. The front end of the bore 49 communicates with the impeller chamber 40, and the rear end of the bore communicates with the diaphragm chamber 45 by way of an angularly extending drill hole 50, thus forming a conduit between the impeller chamber and the diaphragm chamber.

Figure 5:
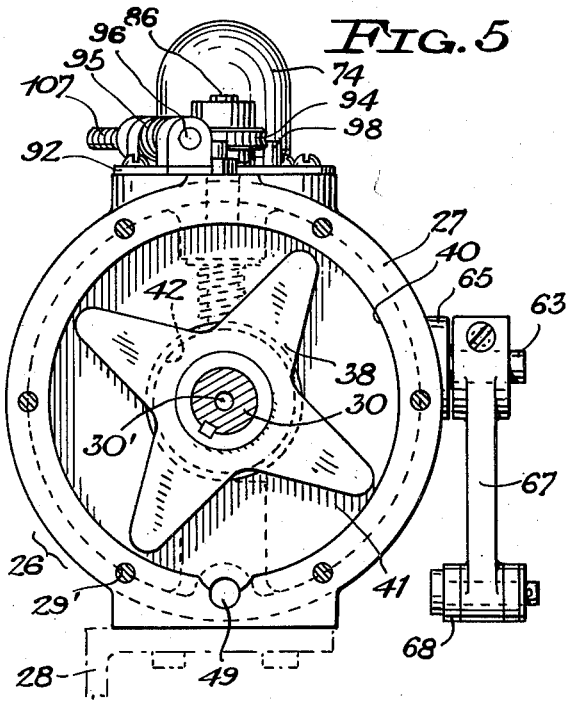
Fig. 5 is a transverse sectional elevational view of the pressure generator, taken generally on the line 5—5 of Fig. 2.
Figure 6:
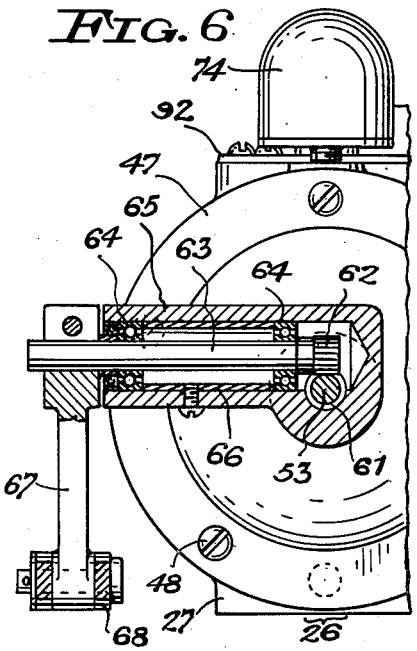
Fig. 6 is a transverse sectional elevational view of valve actuating means of the pressure generator, taken generally on the line 6—6 of Fig. 2.

The housing member has a tubular portion 51 coaxial with the cylindrical casing 27 and provided with a step axial bore 52 in which an operating rod 53 slidably fits. The movable central portion of the diaphragm is clamped between crowned washers 54 and 55, and the adjacent end of the operating rod has a head 56 which abuts against the washer 54. The other end of the operating rod carries a disk or washer 57 against which abuts a compression coiled spring 58 disposed in the housing member, the compression of the spring being adjustable by a cup-shaped nut 59 which is screw-threaded onto the outer end of the housing member and has a central plug 60 engaging the spring. The operating rod is peripherally grooved to form a rack portion 61 which meshes with a pinion 62 formed on the inner end of a transversely extending shaft 63. The pinion shaft 63 is carried on ball bearings 64, Fig. 6, fitting in a side extension 65 of the housing member, the bearings being spaced by a sleeve 66. The outer end of the pinion shaft carries an arm 67 which is connected to the governor valve arm 25 by a link 68, so as to actuate the governor valve.

The spring-adjusting nut 59 is here shown to be controlled by a knob 69 rotatably mounted on a dial-forming plate 70 secured to the vehicle instrument panel 71, the knob and nut being connected by a shaft 72 having universal joints 73.

The governor casing 27 is provided at its top portion with a breather 74 communicating with the oil reservoir, the breather being filled with metal wool 75 and having a vent opening 76. The casing is also provided with a screw-threaded opening 77 communicating with the periphery of the impeller chamber 40 and normally closed by a plug 78. The opening 77 is used when communication is to be made to a diaphragm chamber separate from the casing.

With the construction thus far described, the rotation of the impeller 38 by the engine develops a fluid pressure which is directly proportional to engine speed. This pressure is communicated to the diaphragm chamber 45 through the conduits 49 and 50, urging the diaphragm 46 and operating rod 53 to the right, as viewed in Fig. 2, against the pressure of the coiled spring 58. The axial movement of the rack-forming operating rod by the diaphragm turns the operating shaft 63 in a counter-clockwise direction, as viewed in Figs. 1 and 2, causing the link 68 to turn the governor valve 23 toward its closed position, thus limiting the engine speed, and consequently the vehicle speed, to a value determined by the compression of the spring 58. However, the engine may be caused to run at a slower ungoverned speed by partially closing the manual throttle valve 19. When the power take-off of the vehicle is to be used the manual throttle 19 is set to wide open position, and the spring 58 is adjusted by the nut 59 to a desired speed-setting, as by means of the dial knob 69. An increase of load will tend to slow down the engine but the governor valve will open wider, thus maintaining the engine speed within suitable limits.

In the construction above described, the compression of the spring 58 is varied to adjust the speed setting. For a wide range of speed-settings, this requires a considerable variation in the compression of the spring which may tend to affect sensitivity at certain speed-settings. In order to reduce or minimize the variation in spring compression, means are provided to effect a governing action by varying the fluid pressure generated at any given engine-speed. The governor casing 27, Fig. 2, is provided with aligned upper and lower interior bosses 79 and 80 which are hollow and extend diametrically in the casing. The lower boss 80 has a shouldered vertical bore 81 which communicates with the fluid pressure conduit 49, the boss having one or more lateral ports 82 communicating with the bore. Rotatably fitting in the bore 81 is a hollow valve plug 83 having one or more lateral ports 84 adapted to communicate variably with the ports 82. In some instances, a deflector 85 extends in the conduit 49 in line with the bore 81. The valve plug has a stem 86 which extends through the upper boss 79 and is journalled in a bushing 87 fitting in a bore 88 in this boss, the boss further having an oil seal 89 for the stem. A compressed coiled spring 90 surround the valve stem and presses the valve plug downwardly in the bore 81, the upper end of the spring bearing on a washer 91 slidably keyed on the valve stem. A bearing plate 92 is secured on the upper face of the governor casing 27 and has a sleeve portion 93 slidably fitting over the valve stem 86. A worm wheel 94 is secured to the upper end of the valve stem and meshes with a worm 95 on a horizontal shaft 96 journalled in the bearing plate. If desired, the worm wheel may carry an arm 97 engageable with stop pins 98 on the bearing plate 92 to limit the angular displacement of the valve stem to 90° or other suitable angle.

Figure 9:
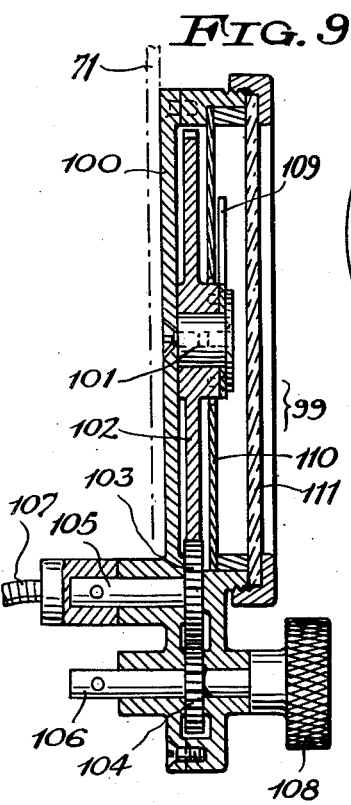
Fig. 9 is a transverse sectional elevation of the control device, taken on the line 9—9 of Fig. 8.
Figure 8:
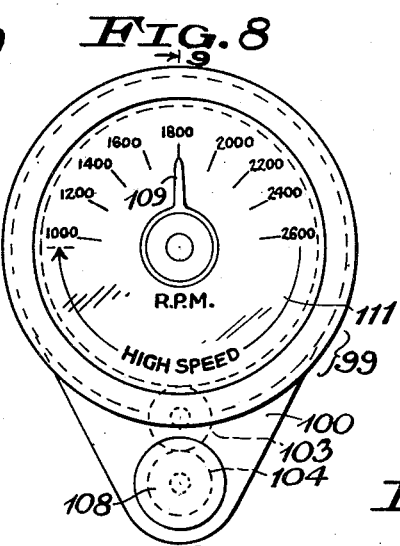
Fig. 8 is a face view of a speed-setting control device.

Mounted on the vehicle instrument panel 71 is a speed selector or control device designated generally by the numeral 99. The speed selector, Figs. 8 and 9, comprises a casing 100 having a pivot member 101 on which a gear 102 is rotatably mounted. The gear meshes with a pinion 103 which in turn meshes with another pinion 104, the pinions having respective shafts 105 and 106 journalled in the casing. One of these shafts, here shown to be the shaft 105, is connected to the worm 95 of the pressure generator by a flexible shaft 107, and the shaft 106 carries an adjusting knob 108. The gear 102 carries an index pointer 109 which cooperates with a suitably calibrated dial plate 110, visible through a transparent panel 111. The speed calibration indicia, here shown by way of example to run from 1000

R. P. M. to 2600 R. P. M., extend over a substantial arcuate space of the dial plate, the remaining space being left blank to be traversed by the index pointer when higher ungoverned engine speeds are desired.

In the form of the invention shown in Figs. 1, 2, 8, and 9, the speed selector 99 serves to adjust the by-pass valve 83 to vary the fluid pressure on the diaphragm, the compression of the spring 58 being held constant. With the by-pass valve fully closed, the engine speed will be determined by the compression of the spring, and will be the lowest governed speed. By way of example, this speed is shown to be 1000 R. P. M. With the pointer 109 of the speed selector set at 1000 R. P. M., the compression of the spring 58 is adjusted to cause the engine to run at this governed speed. Since the spring compression is substantially constant, it is possible to select a spring which will afford good sensitivity. As the pointer is moved to a higher speed indication, the by-pass valve 83 will be gradually opened, thus tending to reduce the fluid pressure on the diaphragm and to thereby cause an opening movement of the governor valve. The engine speed is thereupon increased to a new value and the fluid pressure on the diaphragm is also increased so as to limit the opening movement of the governor valve, maintaining the engine speed substantially constant at its new value. With the by-pass valve fully open, the diaphragm pressure drops to a low value, permitting the engine to be operated at a high speed up to its maximum speed. This adjustment of the by-pass valve is effected when it is desired to operate the vehicle at high speed. The ports of the by-pass valve are shown to be simple bores, but other cross-sectional shapes may be used if it is desired to change the rate of flow with respect to the angular displacement of the valve plug.

In some instances, a high rate of fluid flow in the conduit 49 may tend to cause a static pressure in the end of the conduit communicating with the diaphragm chamber. However, this pressure can be reduced by the use of the deflector 85 which, if desired, may also produce a slight ejector action with respect to the fluid in the diaphragm chamber.

Figure 10:
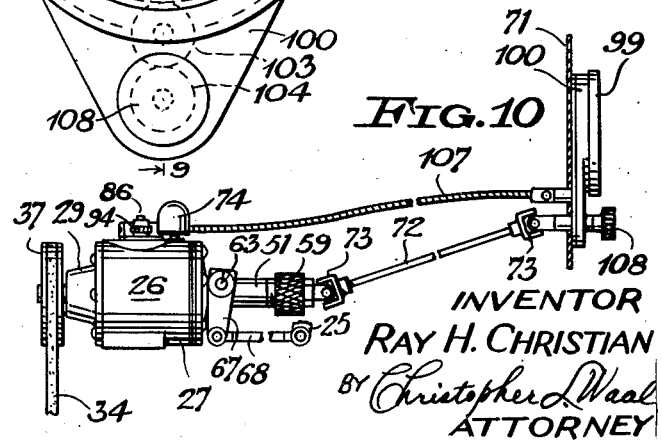
Fig. 10 is a view generally similar to Fig. 1, but showing a modified form of speed-setting means.

In the embodiment shown in Fig. 10, the speed selector serves to effect a conjoint control of the by-pass valve and the spring compression. For this purpose, the flexible shaft 107 for the by-pass valve remains connected to a pinion shaft 105 of the selector, while the actuating shaft 72 for the spring-compressing nut 59 is connected to the pinion shaft 106 of the selector. With this relation, the spring pressure is increased as the by-pass valve is opened, permitting a wide range of governor control with a moderate range of spring compression. In some instances, it is possible to reduce the spring compression as the by-pass valve is opened, making the porting of the by-pass valve less critical.

In the modification shown in Figs. 11 and 12, the pressure generator 126 includes a reservoir-forming casing 127 generally similar to the casing 27 of Fig. 2 and adapted to hold a body of oil 143. A partition wall 141 (corresponding to the wall 41) has a central cup-shaped embossment 142 in which the impeller shaft nut 39 rotates. A cup member 144 closes an end of the casing 127 and is like the cup member 44 except that in some instances it is provided with a small bleed opening 144'. The casing 127 is provided with aligned interior tubular portions 179 and 180 which extend diametrically in the casing and are formed integrally with the casing, the tubular portion 180 merging with the end wall of the cup-shaped embossment 142. Pressed in the tubular portion 180 is a ported sleeve 181 in which is slidably and rotatably fitted a valve rod 182 forming a piston valve, the valve rod also movably fitting in a bushing 183 in the tubular portion 179. The sleeve 181 is provided with one or more inlet ports 184 and a by-pass port 185. The sleeve ports 184 communicate with inlet openings 186 formed in the tubular portion 180 and with inlet openings 187 formed in the cup-shaped embossment 142, and the sleeve port 185 communicates with an outlet opening 188 formed in the tubular portion 180. In some instances, one or more of the openings 186 and 188 may be closed, as by screw plugs 189, one being shown in one of the inlet openings 186. The valve rod is provided with annular grooves 190 adapted to communicate with the inlet ports 184 to control the flow of liquid into the impeller chamber, and the lower end of the valve rod is adapted to control the flow of liquid through the by-pass port 185. The upper end portion of the valve rod has a screw thread 191 which is engaged in a nut member 192 secured, as by screws 193, to the upper wall of the casing 127. A flexible shaft 107 is secured to the upper end of the valve rod and is connected to a suitable manual control, as in Fig. 1 or Fig. 10. The liquid pressure on the lower end of the valve rod urges the rod upwardly, but upward displacement of the rod is resisted by the screw thread 191. Axial lost motion at the screw thread is prevented by a coiled spring 194 surrounding the valve rod and pressing against a collar 195 on the valve rod. The rest of the pressure generator of Fig. 11 is similar to that of Fig. 2.

The operation and control of the device of Fig. 11 is like to that of Fig. 2 except that the intake of liquid to the impeller chamber is valve-controlled, and a slight flow of liquid takes place from the diaphragm chamber 45 to the reservoir by way of the bleed opening 144'. For low governed speeds the valve rod 182 is in the position of Fig. 11, providing maximum inlet area to the impeller chamber and completely closing the by-pass opening 185. For higher speed settings the valve rod is rotated to move it upwardly, thus adjustably limiting the inlet area, and also adjustably opening the by-pass port 185. In some instances, by-passing can be eliminated, as by plugging the screw-threaded outlet opening 188.

The compression of the coiled spring 58 is normally maintained at a suitable value by the nut 59. However, in some cases, the governor may be controlled by conjoint adjustment of the spring tension and the valve means, as suggested in Fig. 10.

What I claim as new and desire to secure by Letters Patent is:

1. A governor adapted to control the throttle valve of an engine, comprising a fluid pressure generator adapted to be driven by the engine, fluid pressure actuated means connected to said generator and adapted for controlling said throttle valve, adjustable resilient means opposing the movement of the said fluid pressure actuated means, adjustable valve means for varying the relation of generator pressure to engine speed to change the speed-setting of the governor, and control means for said resilient means and valve means including a common actuating member for simultaneously adjusting said resilient means and valve means.

2. A governor adapted to control the throttle valve of an engine, comprising fluid pressure developing means with a fluid inlet and a by-pass, throttle valve controlling means responsive to the pressure of said pressure developing means, and adjustable valve means for simultaneously controlling both said inlet and by-pass to change the speed setting of the governor.

RAY H. CHRISTIAN.

REFERENCES CITED

The following references are of record in the file of this patent:

UNITED STATES PATENTS

| Number | Name | Date |
|---|---|---|
| 137,662 | Duff | Apr. 8, 1873 |
| 941,409 | Ehrhart | Nov. 30, 1909 |
| 1,027,221 | Strain | May 21, 1912 |
| 1,089,655 | Loewenstein | Mar. 10, 1914 |
| 1,262,454 | Collingham | Apr. 9, 1918 |
| 2,221,308 | Dischert | Nov. 12, 1940 |
| 2,247,989 | Cita | July 1, 1941 |
| 2,369,397 | Kostenick | Feb. 13, 1945 |

FOREIGN PATENTS

| Number | Country | Date |
|---|---|---|
| 6,345 | Switzerland | Mar. 6, 1893 |